March 5, 1968  H. J. VENABLES III  3,371,514
INDEXING APPARATUS
Filed Sept. 1, 1965  3 Sheets-Sheet 1

INVENTOR
HERBERT J. VENABLES, III

BY McNenny, Farrington, Pearne & Gordon
ATTORNEYS

March 5, 1968    H. J. VENABLES III    3,371,514
INDEXING APPARATUS

Filed Sept. 1, 1965    3 Sheets-Sheet 2

INVENTOR
*HERBERT J. VENABLES, III*

McNenny, Farrington, Pearne & Gordon
ATTORNEYS

March 5, 1968 H. J. VENABLES III 3,371,514
INDEXING APPARATUS
Filed Sept. 1, 1965 3 Sheets-Sheet 3

INVENTOR
HERBERT J. VENABLES, III

BY McNenny, Farrington, Pearne & Gordon
ATTORNEYS

United States Patent Office 3,371,514
Patented Mar. 5, 1968

3,371,514
INDEXING APPARATUS
Herbert J. Venables III, Cleveland, Ohio, assignor to The Venables Machine & Tool Co., Cleveland, Ohio, a partnership
Filed Sept. 1, 1965, Ser. No. 484,382
12 Claims. (Cl. 72—421)

ABSTRACT OF THE DISCLOSURE

An indexing device for use with machine tools having a reciprocating tool carrier is arranged so that the tool carrier reciprocation provides indexing power. An indexing member adapted to index and support a workpiece is supported for limited movement in the direction of tool carrier movement so that the workpiece can move from a normal position into a work position and then be returned to its normal position clear of the tools before the indexing occurs. A cam mechanism is driven by the reciprocating tool carrier to cause the indexing operation only when the indexing member is in its normal position.

---

This invention relates generally to indexing devices and more particularly to an indexing device for use with machine tools having reciprocating tool carriers or the like.

My United States Patent No. 3,161,070 discloses an indexing device adapted to be driven by a reciprocating tool carrier. However, in that device there is no provision for movement of the workpiece to insure that the workpiece clears the tools and dies prior to indexing. One of the features of an indexing mechanism incorporating the present invention is the provision for limited movement of the workpiece in the direction of the tool movement. This movement is arranged so that the workpiece moves clear of the tools and dies prior to indexing.

The present invention is illustrated installed in a press type machine arranged to produce a projection in a cylindrical workpiece. The indexing shaft of the device and the workpiece support are arranged to move laterally so that the workpiece moves into engagement with the stationary female die prior to the forming operation. After the forming operation the elements return to the initial position. This latter movement causes the workpiece to clear the female die prior to indexing operation.

Although the indexing mechanism is illustrated for use with only one type of forming operation it should be understood that the mechanism is particularly suited for use in many types of operations such as punching, cutting, and otherwise shaping a workpiece.

It is an important object of this invention to provide an indexing mechanism for use with machine tools having a reciprocating slide incorporating novel and improved indexing drive means operable in response to slide reciprocation.

It is another important object of this invention to provide an indexing mechanism incorporating novel and improved drive means operable to rotate a workpiece step-by-step through a series of indexed positions in response to the reciprocation of an element of an associated machine.

It is another important object of this invention to provide a novel and improved indexing mechanism arranged to step-by-step rotate a workpiece through a series of indexing positions while permitting lateral movement of the workpiece during predetermined phases of the indexing cycle.

It is another important object of this invention to provide a novel and improved indexing mechanism including a housing, an indexing shaft journaled on the housing, a drive shaft journaled for reciprocation in the housing and indexing means for step-by-step rotation of the indexing shaft in response to reciprocation of the drive shaft wherein the indexing shaft is normally maintained in a predetermined position and is laterally movable therefrom.

It is still another object of this invention to provide an indexing mechanism including a housing journaled for rotary reciprocation about a support axis, a drive shaft journaled for rotary reciprocation about the support axis, and an indexing shaft journaled for indexing rotation, by the drive shaft, about an indexing axis spaced from the support axis wherein means are provided to resiliently maintain the indexing shaft in a predetermined position while allowing lateral movement thereof from such predetermined position.

Further objects and advantages will appear from the following description and drawings wherein.

Figure 1:
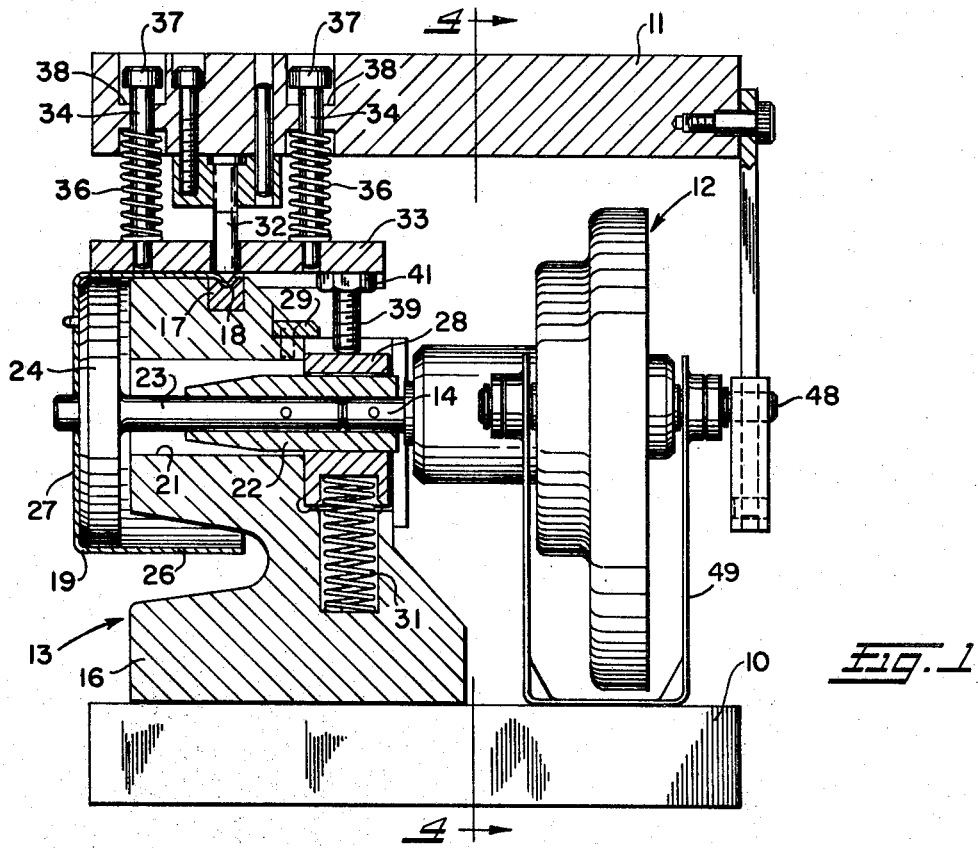
FIGURE 1 is a side elevation, partially in section, illustrating a preferred form of indexing mechanism incorporating this invention installed on a press equipped with tools operable to form a radial projection in the wall of a cylindrical workpiece, with the various elements illustrated in the position they assume at the moment the working operation is completed.
Figures 2, 3:
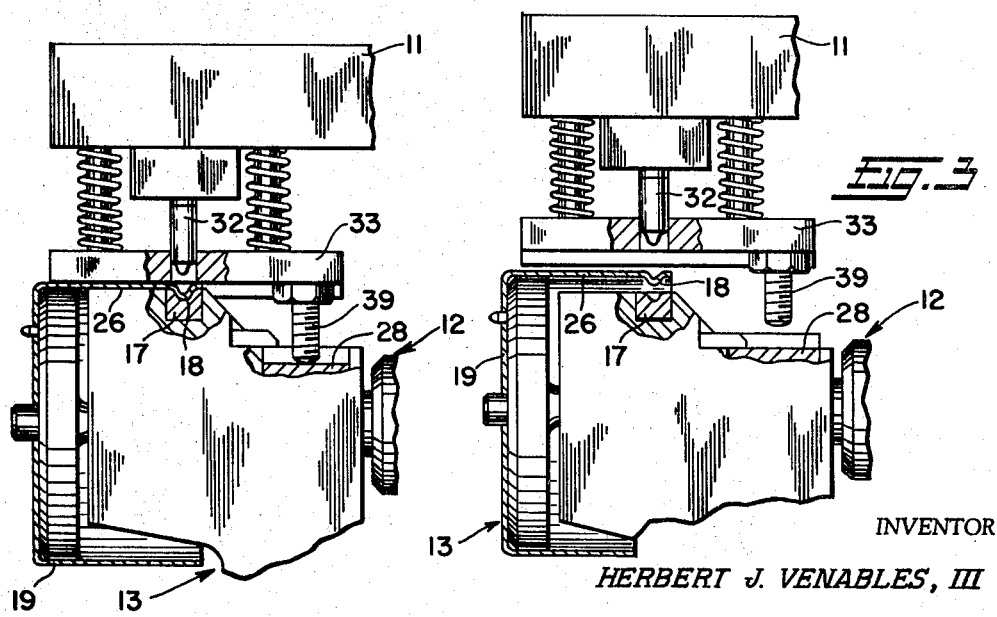
FIGURE 2 is a fragmentary section illustrating the tools in an intermediate position wherein the workpiece is held against the female die and the punch has retracted clear of the workpiece.
FIGURE 3 is a fragmentary section similar to FIGURE 2 illustrating the positions the elements assume when the punch is retracted clear of the workpiece and the workpiece is clear of the female die.

Referring to FIGURES 1 through 3, a preferred form of this invention is illustrated installed upon a press having a base 10 and a reciprocating tool slide 11 of the type normally driven for vertical reciprocation by a crank and pitman drive. In FIGURE 1 the slide 11 is shown in its forward extreme position and FIGURES 2 and 3 illustrate the slide in progressive position of retraction from its forward position.

The indexing mechanism includes two assemblies, the indexing drive assembly 12 and the work support assembly 13. The indexing drive assembly includes an indexing shaft 14 sequentially rotated in a step-by-step manner through a series of indexing positions by the drive asssembly 12. This structure and its operation will be discussed in detail below.

The work support assembly includes a die support base 16 mounted on the machine base 10 which is turn supports a stationary female die 17. The female die 17 is formed with a die cavity in which a projection 18 is formed on a workpiece 19. The base 16 is formed with a horizontal through bore 21 into which the indexing shaft 14 projects. Mounted on the end of the indexing shaft 14 is a coupling sleeve 22 which connects the indexing shaft 14 to the stem 23 of a work support 24. The illustrated workpiece 19 is a cylindrical member having a cylindrical skirt 26 and an end wall 27 which is mounted on the work support 24 with the skirt 26 coaxial with the axis of the indexing shaft 14 and stem 23. The work support 24 and the indexing shaft 14 are supported in a vertically movable bearing block 28 slidably mounted in the base 16 for movement between an upper extreme position in which the bearing block engages a stop 29, as illustrated in FIGURE 3, and a lower position, as illustrated in FIGURES 1 and 2. The bearing block 28 is normally maintained in one position and is movable from its normal position during the operating cycle. In the illustrated embodiment a spring 31 mounted in the base 16 engages the lower side of the bearing block 28 resiliently urging it toward engagement with the stop 29.

Mounted on the slide 11 is a tool 32 proportioned to cooperate with the die 17 and form a lateral projection 18 in the skirt 26 of the workpiece 19, as illustrated in FIGURE 1. Also mounted on the slide 11 is a pusher plate 33 supported on guide pins 34 which permit relative vertical movement between the pusher plate 33 and the slide 11. Springs 36 resiliently urge the pusher plate 33 downwardly with respect to the slide and normally maintain the heads 37 on the guide pins 34 against a shoulder 38 on the slide 11 to limit downward movement of the pusher plate with respect to the slide.

A screw 39 is mounted on the pusher plate 33 and is locked in its adjusted position by a locknut 41. The screw 39 is arranged to engage the upper end of the bearing block 28 as the slide 11 approaches its lowermost position of FIGURE 1 and push the bearing block and in turn the indexing shaft 14 and the work support 24 downwardly against the action of the spring 31. The springs 36 are sized so that they overcome the spring 31 to produce this movement. The pusher plate 33 also engages the cylindrical skirt 26 of the workpiece 19 and presses it into engagement with the upper surfaces of the die 17.

In operation the spring 31 maintains the bearing block 28 against the stop 29 when the slide is spaced away from the workpiece prior to the forming operation. At this time the skirt 26 is spaced above the die 17 a distance illustrated in FIGURE 3. As the slide moves down the pusher plate 33 engages the cylindrical skirt 26 and simultaneously the screw 39 engages the bearing block 28. Continued downward movement of the slide results in lateral or downward movement of the workpiece 19 and the bearing block 28 until the skirt 26 engages the upper surface of the die 17. At this point in the cycle the tool 32 is still spaced from the skirt.

The engagement of the skirt 26 with the upper surface of the base 16 and the die 17 prevents further downward movement of the pusher plate 33 so the workpiece is held stationary in position for working. As the slide continues to move down to the position of FIGURE 1 the tool 32 engages the skirt 26 pressing it into the die 17 forming the projection 18.

Thereafter the slide retracts with the first portion of the retraction lifting the tool 32 out of the projection 18 and the pusher plate 33 holding the workpiece in the worked position. This is the condition illustrated in FIGURE 2. Further retraction of the slide 11 beyond the position of FIGURE 2 starts to lift the pusher plate 33 allowing the spring 31 to raise the workpiece and in turn the projection 18 clear of the die 17, as illustrated in FIGURE 3. At this point in the cycle, illustrated in FIGURE 3, the workpiece 19 is free to index since the projection 18 is clear of the die 17 and the pusher plate 33 has been raised away from the workpiece. The indexing drive assembly 12 then rotates the indexing shaft 14 and in turn the workpiece to the next indexing position after which the cycle is repeated.

It should be understood that the illustrated die arrangement is shown only for purposes of illustration and that the indexing structure which accommodates limited movement of the workpiece in the direction of slide travel is desirable in many other types of operations. In punching for instance, there is a tendency to form a burr which should be raised clear of the die prior to indexing.

Figure 4:
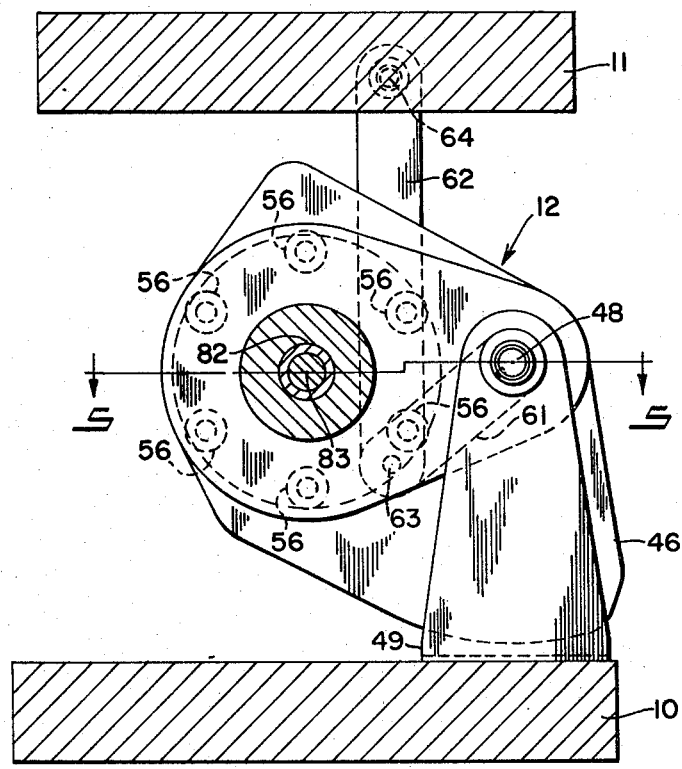
FIGURE 4 is a side elevation taken along 4—4 of FIGURE 1 illustrating the general structure of the indexing housing and the arrangement of the indexing cam followers.
Figure 5:
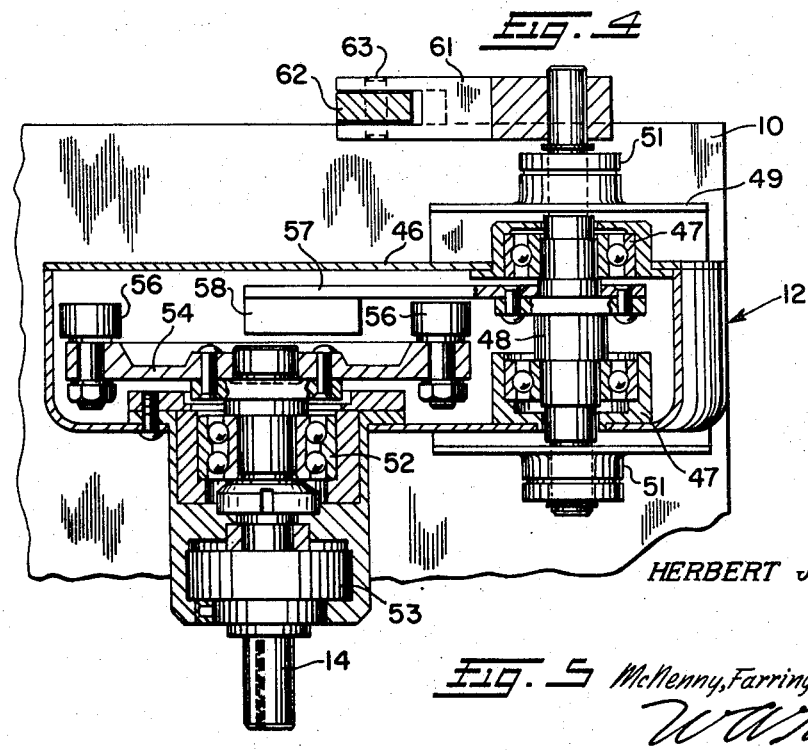
FIGURE 5 is a cross-section taken along 5—5 of FIGURE 4 illustrating the structural detail of the indexing drive; and, FIGURES 6a through 6e are schematic fragmentary views illustrating the cam drive in progressive positions in an operating cycle.

Referring now to FIGURES 1, 4 and 5, the indexing drive assembly 12 includes a housing 46 provided with bearings 47 through which a drive shaft 48 extends so that the drive shaft 48 and housing 46 are connected for relative rotation about the longitudinal axis of the drive shaft 48. The drive shaft 48 and in turn the housing 46 is supported on the base 10 by a U-shaped support member 49 provided with bearings 51 to rotationally support the shaft 48 at spaced locations along the shaft. Therefore, both the shaft 48 and the housing 46 are supported by the machine base 10 but are free for rotation with respect thereto.

The indexing shaft 14 is journaled in the housing 46 within a bearing 52 for rotation relative to the housing 46 about its longitudinal axis. An overriding or one-way brake 53 is mounted in the housing 46 around the end of the indexing shaft 14 and is connected to prevent rotation of the indexing shaft 14 in an anticlockwise direction. Mounted on the inner end of the indexing shaft 14 is a plate 54 which supports a plurality of symmetrically arranged cam followers 56. In the illustrated embodiment there are six cam followers 56 mounted on the plate.

Mounted on the drive shaft 48 is a cam support arm 57 which rotates with the drive shaft 48 and supports drive cams 58 and 59. The operation of these drive cams will be discussed in detail below. A drive linkage is provided to reciprocate or oscillate the drive shaft 48 through a predetermined angle during each cycle of movement of the slide 11. This linkage includes a crank arm 61 mounted on the end of the drive shaft 48 and a connecting rod or link 62 pivoted at 63 on the arm 61 and at 64 on the slide 11. The crank arm 61 and the connecting rod 62 are proportioned so that the drive shaft 48 is reciprocated through a predetermined angle each time the slide 11 moves from its retracted extreme position to its forward extreme position.

By utilizing a crank arm and connecting rod structure it is relatively easy to modify the linkage so that the desired angle of reciprocation of the drive shaft 48 will be produced for substantially any length of stroke of the slide 11. For example, if the stroke of the slide 11 is shorter the length of the crank arm 61 is reduced by locating the pivot 63 at a point closer to the drive shaft 48. Conversely longer slide strokes can be accommodated while still providing the necessary reciprocating angle of the drive shaft by lengthening the effective length of the crank arm 61. Also, the length of the connecting rod 62 is chosen to provide the proper position of the drive shaft at the top and bottom extremes of slide movement. In the illustrated embodiment the crank arm and connecting rod do not include an adjustment structure since a particular indexing mechanism is normally set-up for use on a single machine. For different machines the lengths of the crank arm and connecting rod are changed but the structure of the cam drive remains the same.

Figure 6A:
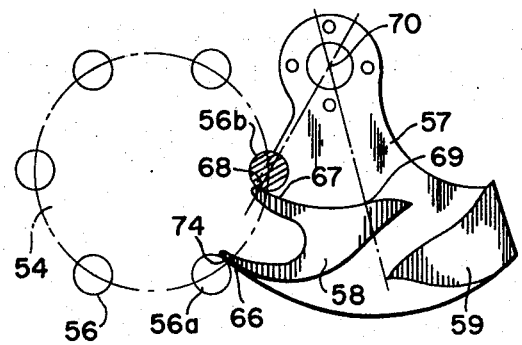

The operation of the cams 58 and 59 and the cam followers is best illustrated in FIGURES 6a through 6e. FIGURE 6a illustrates the relative position of the followers and cams when the support arm 57 is in the position it assumes when the slide 11 is in its forward extreme position. The cam 58 is formed with opposed camming surfaces 66 and 67. Their spacing is arranged so that each of the surfaces 66 and 67 engage a cam follower 56 with the surface 66 engaging the cam follower 56a at the point 79 and the cam surface 67 engaging the cam follower 56b at the point 68. Consequently, the cam follower and, in turn, the indexing shaft supporting the cam follower is locked in a fixed indexed position at this point in the operation cycle.

Figure 6B:
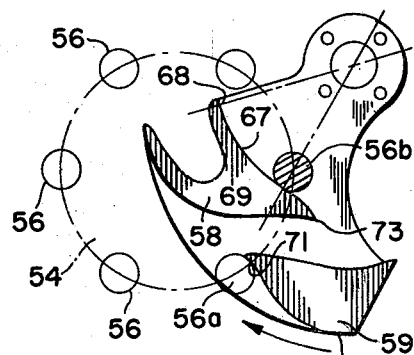

As the slide 11 retracts toward its retracted position it causes clockwise rotation of the support arm 57 from the position of FIGURE 6a to the position of FIGURE 6b. During this phase of operation the cam follower 56b moves along the cam surface 67 to the point 69. The surface 67 of the cam 58 is formed with a constant radius, with respect to the axis 70 of the drive shaft, between the point 68 and the point 69. Consequently, the cam does not produce any clockwise rotation of the cam followers and the indexing shaft remains stationary during this portion of the cycle. Since the one-way brake 53 (illustrated in FIGURE 5) prevents anticlockwise rotation of the followers the fact that the cam follower 56a is out of contact with the cam surface 66 does not affect the operation of the assembly.

When the point in the cycle illustrated in FIGURE 6b is reached the cam follower 56a engages the surface of the cam 59 at 71. The surface of the cam 59 between 71 and 72 is formed to cause clockwise rotation of the cam plate 54 through about one half of an indexing increment when the cam support arm 57 moves between the position of FIGURE 6b and FIGURE 6c. Since the illustrated embodiment provides six indexed positions this movement is 30°. In the event other numbers of indexing positions are required the cam shapes are modified accordingly. The cam 58 is shaped between the point 69 and the point 73 to permit this rotation.

Figure 6C:
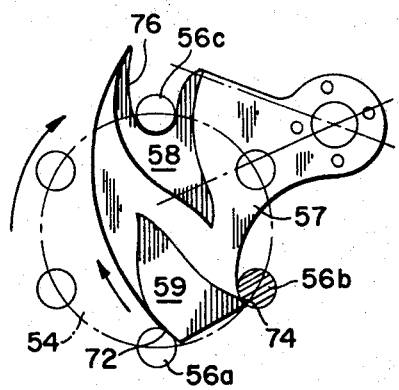

In the position of FIGURE 6c the cam follower 56b engages the cam 59 at 74 while the cam follower 56a engages the point 72. The cam 58 is formed with a recess 76 to accommodate the uppermost cam follower 56c without contact to prevent interference. The position of FIGURE 6c is reached when the slide 11 reaches its retracted extreme position. As the slide starts back toward the forward extreme position the arm 57 commences to rotate in an anticlockwise direction until it reaches the position illustrated in FIGURE 6d. During this movement the follower 56b moves along the face of the cam 59 from the point 74 to the point 77. The cam 59 between the point 74 and 77 has a constant radius so the cam follower 56b remains stationary. Here again, the one-way brake 53 prevents anticlockwise rotation of the cam support plate 54.

Figure 6D:
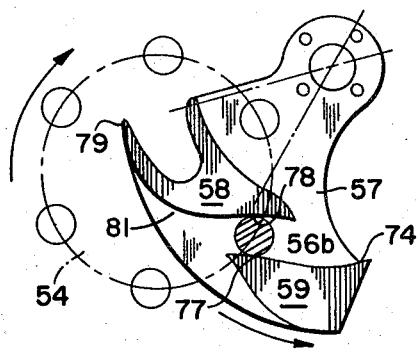
Figure 6E:
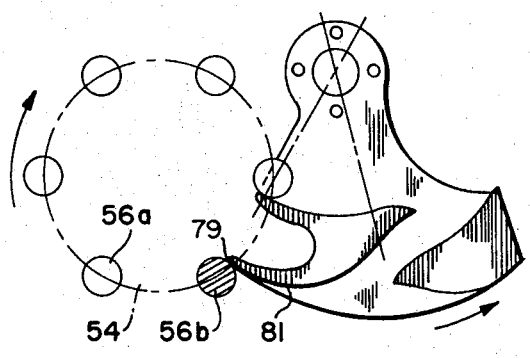

From the position of FIGURE 6d, wherein the cam follower 56b engages the cam 58 at the point 78, the support arm 57 moves to the position of FIGURE 6e, wherein the follower 56b engages the cam 58 at the point 79. The cam 58 between the points 78 and 81 is formed with an increasing radius, so the cam follower 56b causes rotation of the cam support plate 54 through an additional thirty degrees. The cam surface between 81 and 79 has a constant radius, with respect to the axis 70, so that the indexing motion is completed prior to the arrival of the slide 11 at its forward extreme position. Therefore, the workpiece is held stationary during the working operation.

After the completion of the working operation slide 11 starts to retract and the cycle described immediately above is repeated. The cycling is repeated in the illustrated embodiment six times with the workpiece moving through six predetermined indexed positions and back to its initial position. The workpiece 19 is then removed and a subsequent workpiece is positioned on the support 24.

It is recognized that the vertical movement of the indexing shaft 14 and in turn the workpiece follows an arc having a center of curvature at the axis of the drive shaft 48. The elements are arranged so that the axis of the indexing shaft 14 moves between the points 82 and 83 (illustrated in FIGURE 4). The points 82 and 83 are equal distances on opposite sides of the horizontal plane through the axis of the drive shaft 48 to minimize the lateral displacement in a horizontal direction. The cam 58 is arranged so that the indexing movement is completed before the pusher plate 33 produces this lateral movement.

With an indexing device incorporating the present invention separate indexing drives are eliminated and the apparatus is arranged to be driven by the reciprocation of the slide of the press. The linkage for driving the indexing mechanism is arranged to permit easy compensation for various slide strokes. Further, the mounting of the indexing mechanism is arranged to permit limited travel of the workpiece in the direction of slide movement so that the workpiece is completely free of both the die 17 and the tool 32 prior to indexing.

Although a preferred embodiment of this invention is illustrated, it is to be understood that various modifications and rearrangements of parts may be resorted to without departing from the scope of the invention as defined in the following claims.

What is claimed is:

1. An indexing device for use with machines having a reciprocating element comprising a base, a housing supported on said base, an indexing member adapted to support and index a workpiece mounted on said housing for indexing motion, a drive member journaled on said housing, a linkage adapted to connect said drive member and reciprocating element operable to reciprocate said drive member in response to reciprocation of said element, drive means connected between said drive member and indexing member operable to move said indexing member to progressive positions each time said drive member reciprocates through a cycle and returns to a first position, a stop operable to limit movement of said indexing member in one direction to a predetermined position relative to said base, and a spring urging said indexing member in said one direction toward said stop and yieldably permitting movement of said indexing member in the opposite direction, said indexing member being formed so that a workpiece supported thereby is free to index when said indexing member is in said predetermined position, and said drive means operating to index said indexing member only when said indexing member is in said predetermined position.

2. An indexing device for use with machines having a reciprocating member comprising a base, a housing supported on said base, an indexing shaft journaled on said housing for rotation relative thereto, said indexing shaft being adapted to index a workholder, a drive shaft journaled on said housing, a linkage adapted to connect said drive shaft and reciprocating member operable to reciprocate said drive shaft through a predetermined angle in response to reciprocation of said member, drive means connected between said drive shaft and indexing shaft operable to rotate said indexing shaft in one direction through an indexing angle each time said drive shaft reciprocates through said predetermined angle and returns to a first position, a lateral stop operable to limit movement of said indexing shaft in a first direction to a predetermined position, a spring laterally urging said indexing shaft in said first direction toward said stop and yieldably permitting lateral movement of said indexing shaft in the opposite direction.

3. An indexing device for use with machines having a reciprocating member comprising a base, a housing supported on said base for pivotal movement about a first axis, an indexing shaft journaled on said housing for rotation relative thereto about a second axis, said indexing shaft being adapted to index a workholder, a drive shaft journaled on said housing for rotation about said first axis, a linkage adapted to connect said drive shaft and reciprocating member operable to reciprocate said drive shaft through a predetermined angle in response to reciprocation of said member, drive means connected between said drive shaft and indexing shaft operable to rotate said indexing shaft in one direction through an indexing angle each time said drive shaft reciprocates through said predetermined angle and returns to a first position, a lateral stop operable to limit pivotal movement of said indexing shaft about said first axis to a predetermined position, a spring laterally urging said indexing shaft in one direction toward said stop and yieldably permitting lateral movement of said indexing shaft in the opposite direction.

4. An indexing device for use with machines having a reciprocating member movable along a line of action comprising a base, a housing supported on said base, an indexing shaft journaled on said housing for rotation relative thereto, said indexing shaft being adapted to index a workholder, a drive shaft journaled on said housing, a linkage adapted to connect said drive shaft and reciprocating member operable to reciprocate said drive shaft through a predetermined angle in response to reciprocation of said member, drive means connected between said drive shaft and indexing shaft operable to rotate said indexing shaft in one direction through an indexing angle each time said drive shaft reciprocates through said predetermined angle and returns to a first position, said indexing shaft being movable relative to said base in a direction substantially parallel to said line of action, and spring and stop means operable to normally maintain said indexing shaft in a predetermined position and yieldably permitting movement of said indexing shaft away from said predetermined position.

5. In a device of the character described a base, a tool assembly reciprocable relative to said base along a line of action, a housing journaled on said base for pivotal reciprocation about a first axis, indexing shaft means journaled on said housing for rotation about a second axis parallel to and spaced from said first axis, said indexing shaft means being adapted to support a workpiece, indexing drive means including a drive shaft reciprocated in response to reciprocation of said tool assembly and operably connected to progressively rotate said indexing shaft to a series of indexing positions, stop means supported by said base operable to limit pivotal movement of said housing in one direction to a first position and allow pivotal movement in the opposite direction to a second position, resilient means normally maintaining said housing and said first position, said tool assembly being adapted to move said housing to said second position during the working of a workpiece supported by said indexing shaft means.

6. In a device of the character described a base, a tool assembly reciprocable relative to said base along a line of action, a housing journaled on said base for pivotal reciprocation about a first axis, indexing shaft means adapted to support a workpiece, said indexing shaft means being journaled on said housing for rotation about a second axis parallel to and spaced from said first axis, indexing drive means including a drive shaft journaled on said first axis reciprocated in response to reciprocation of said tool assembly and operably connected to progressively rotate said indexing shaft to a series of indexing positions, stop means supported by said base operable to limit pivotal movement of said housing in one direction to a first position and allow pivotal movement in the opposite direction to a second position, resilient means normally maintaining said housing and said first position, said tool assembly being adapted to move said housing to said second position during the working of a workpiece supported by said shaft means, a plane containing said first and second axes being substantially perpendicular to said line of action.

7. A machine tool and indexing device comprising a base, an indexing mechanism mounted on said base including shaft means adapted to support a workpiece and journaled to progressively move such workpiece through a series of indexed positions, a fixed die on said base engaged by said workpiece during working operations thereon, said shaft means normally maintaining said workpiece spaced from said die, a reciprocating tool assembly operable as it approaches a forward position to engage said workpiece and cooperate with said die to perform an operation on the workpiece, said tool assembly including a pusher element laterally moving said shaft means to position the workpiece against the die as the tool assembly approaches the forward position and releasing the workpiece after said tool assembly retracts from said forward position, said indexing mechanism including cam means operative in response to reciprocation of said tool assembly to progressively move said indexing mechanism to said indexed positions with indexing movement occurring only while said pusher element is spaced from said workpiece.

8. A machine tool and indexing device comprising a base, an indexing mechanism mounted on said base including an indexing member adapted to support a workpiece and progressively move such workpiece through a series of indexed positions, a fixed die on said base engaged by said workpiece during working operations thereon, a reciprocating tool assembly operable as it approaches a forward position to engage said workpiece and cooperate with said die to perform an operation on the workpiece, said indexing member being journaled for rotation about an axis and laterally movable relative to said base, yieldable means normally positioning said indexing member in a normal position in which said workpiece is spaced from said die, said indexing member being laterally movable to an operated position in which the workpiece engages said die, said tool assembly including a pusher operable to move said indexing member to said operated position as the tool assembly approaches the forward position and allowing said indexing member to return to its normal position after said tool assembly retracts from said forward position.

9. A machine tool and indexing device comprising a base, an indexing mechanism mounted on said base including an indexing member adapted to support a workpiece and progressively move such workpiece through a series of indexed positions, a fixed die on said base engaged by said workpiece during working operations thereon, a reciprocating tool assembly operable as it approaches a forward position to engage said workpiece and cooperate with said die to perform an operation on the workpiece, said indexing member being journaled for rotation about an axis and laterally movable relative to said base, yieldable means normally positioning said indexing member in a normal position in which said workpiece is spaced from said die, said indexing member being laterally movable to an operated position in which the workpiece engages said die, said tool assembly including a pusher operable to move said indexing member to said operated position as the tool assembly approaches the forward position and allowing said indexing member to return to its normal position after said tool assembly retracts from said forward position, said indexing mechanism including cam means operative in response to reciprocation of said tool assembly to progressively move said indexing mechanism to said indexed positions with indexing movement occurring only while said indexing member is in said normal position.

10. An indexing device comprising a base, an indexing member adapted to support and index a workpiece supported by said base for indexing motion, a slide mounted for reciprocation relative to said base along a line of action, the support of said indexing member by said base permitting movement of said indexing member in response to slide movement substantially parallel to said line of action from a normal position to a work position, and cam drive means operable in response to reciprocation of said slide to move said indexing member between indexed positions only when said indexing member is in said normal position.

11. An indexing device comprising a base, a tool carrying slide reciprocable relative to said base between forward and rearward positions, a housing on said base, an indexing member journaled on said housing, a drive member journaled on said housing for rotary reciprocation between predetermined first and second positions, cam means operably connected to rotate said indexing member between indexed positions in response to reciprocation of said drive member through a cycle from said first position to said second position and back to said first position, a crank arm on said drive member, a connecting rod pivotally connected to said crank arm and slide, said crank arm and connecting rod being proportioned to move said drive member to one of said first and second positions when said slide moves to said forward position and also move said drive member to the other of said first and second positions when said slide moves to said rearward position.

12. An indexing device comprising a base, a slide reciprocable relative to said base between forward and rearward positions, a housing on said base, an indexing member journaled on said housing, a drive member journaled on said housing for rotary reciprocation between predetermined first and second positions, cam means operably connected to rotate said indexing member between indexed positions in response to reciprocation of said drive member through a cycle from said first position to said second position and back to said first position, a crank arm on said drive member, a connecting rod pivotally connected to said crank arm and slide, said crank arm and connecting rod being proportioned to move said drive member to one of said first and second positions when said slide moves to said forward position and also move said drive member to the other of said first and second positions when said slide moves to said rearward position, said cam means preventing rotation of said indexing member during a portion of the cycle of said slide in which it is adjacent said forward position.

References Cited

UNITED STATES PATENTS

| | | | |
|---|---|---|---|
| 3,126,045 | 3/1964 | Streit | 72—421 |
| 3,161,070 | 12/1964 | Venables | 74—161 X |

CHARLES W. LANHAM, *Primary Examiner.*

E. SUTTON, *Assistant Examiner.*